June 30, 1953  N. SCHNOLL  2,644,135
CURRENT INDICATOR
Filed March 20, 1950  3 Sheets-Sheet 1
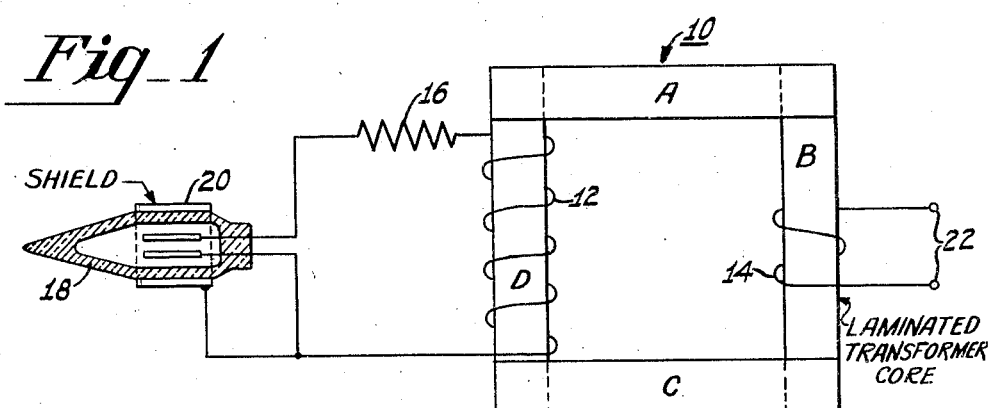
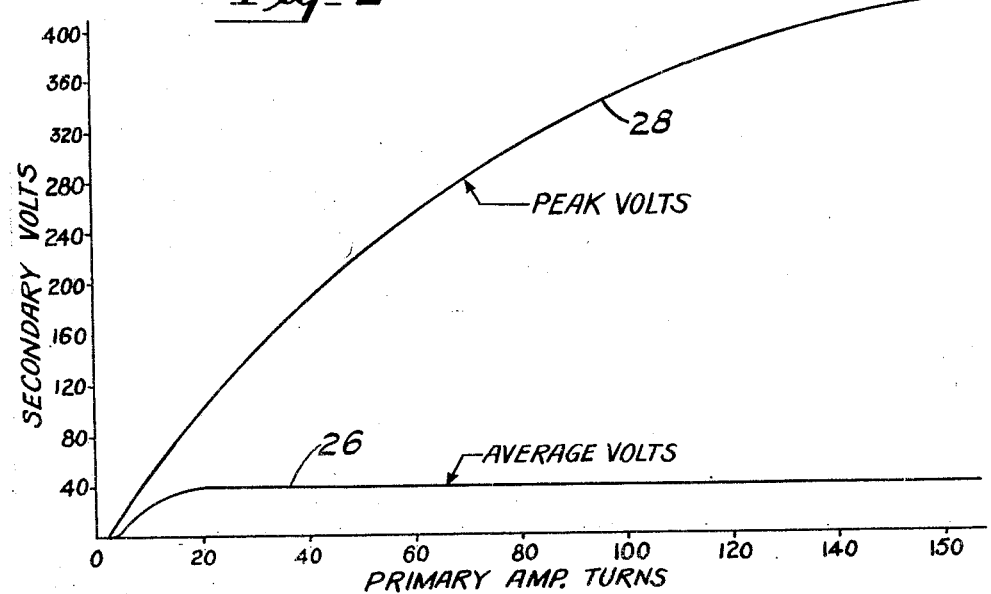
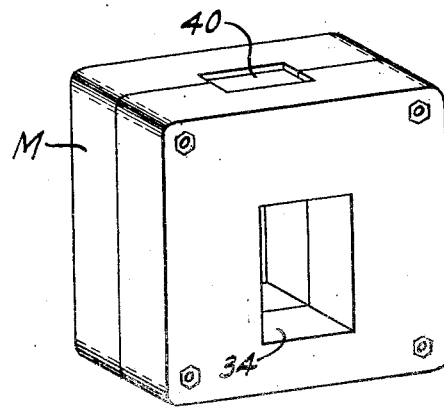
INVENTOR
Nathan Schnoll

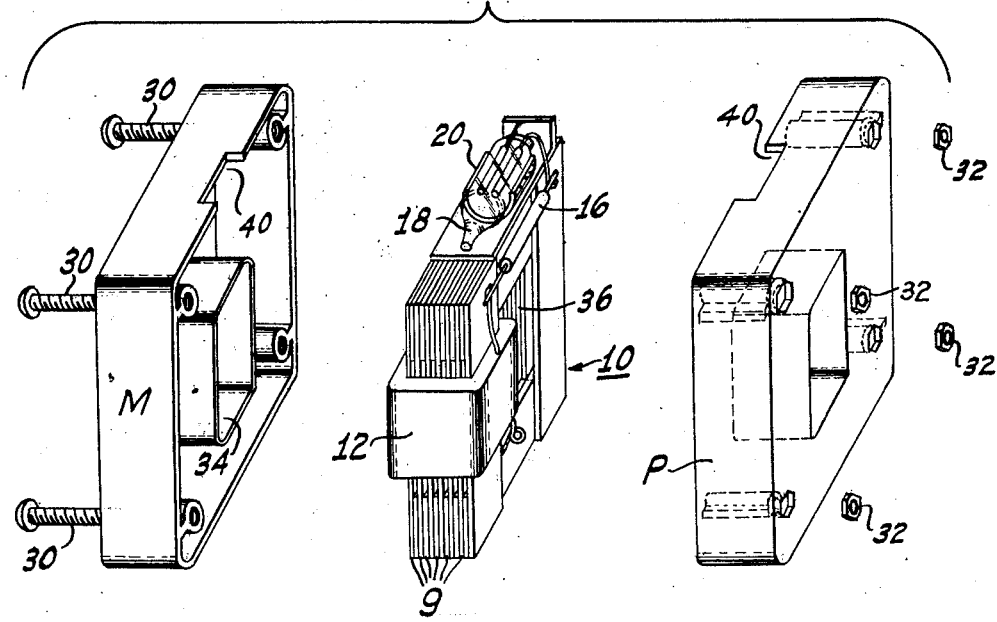
*Fig_4*
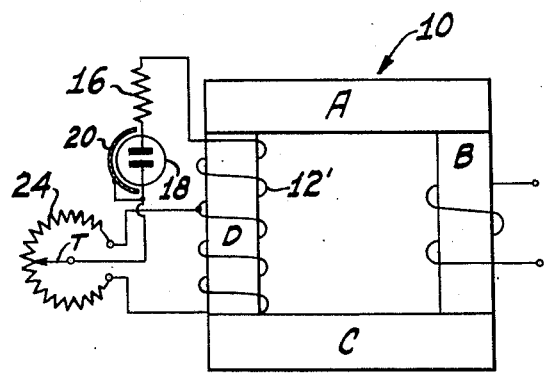
*Fig_5*
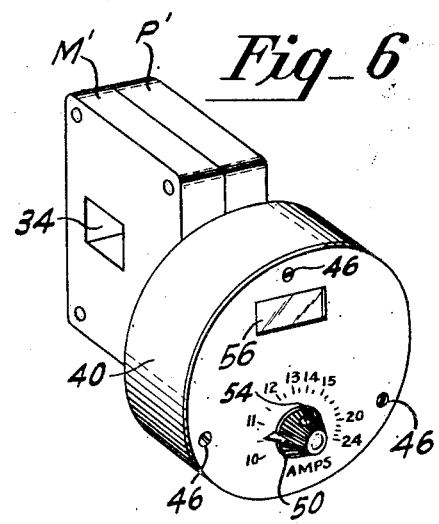
*Fig_6*
INVENTOR
Nathan Schnoll

June 30, 1953 N. SCHNOLL 2,644,135
CURRENT INDICATOR

Filed March 20, 1950 3 Sheets-Sheet 3

INVENTOR
Nathan Schnoll

Patented June 30, 1953

2,644,135

UNITED STATES PATENT OFFICE 2,644,135

CURRENT INDICATOR

Nathan Schnoll, Palisade, N. J.

Application March 20, 1950, Serial No. 150,680

3 Claims. (Cl. 324—98)

This invention relates to alternating current measuring devices.

An object of the invention is to provide a relatively inexpensive, compact, lightweight and rugged current indicator having a moderate degree of accuracy, and which can be used as a highly practical tool by service men.

Another object is to provide a current indicator which can be overloaded with little danger of damage to the instrument.

An important aspect of the current indicator of the invention is the mechanical configuration and engineering design which makes the device extremely simple to manufacture and assemble and enables the device to withstand relatively hard usage, both physical and electrical, without any effect on its ability to perform satisfactorily.

Briefly, the current measuring device or indicator of the invention comprises a core of magnetic material, preferably made of commercial laminated sheet material, having a central opening through which the conductor carrying the alternating current to be measured can be passed. A secondary winding of many turns surrounds one or more legs of the laminated core. A glow lamp, for example a neon lamp, is connected across the secondary winding through a current limiting resistor. The neon glow lamp is essentially a peak voltage indicator. A plastic case surrounds and conceals the magnetic core and is provided with an opening registering with the central core opening.

In accordance with one embodiment of the invention, the plastic case also surrounds the glow lamp and current limiting resistor and is provided with a relatively small aperture for enabling visual inspection of the glow lamp. In accordance with another embodiment of the invention, a potentiometer is provided in circuit with the glow lamp, and a calibrated scale on or in association with the plastic case enables a measurement over a range of values merely by rotating a knob linked to a movable tap on the potentiometer.

A more detailed description of the invention following, in conjunction with drawings, wherein:

Fig. 1 shows a circuit diagram of one embodiment of the alternating current indicator of the invention;

Fig. 2 is a graph explanatory of the operating characteristics of the glow lamp used to provide the visual indication in the device of the invention;

Fig. 3 is a perspective view of the completed manufactured article in accordance with one embodiment of the invention whose circuit diagram is shown in Fig. 1;

Fig. 4 is an exploded view of the device of Fig. 3;

Fig. 5 is a circuit diagram of another embodiment of the alternating current indicator of the invention, showing the use of a potentiometer;

Fig. 6 is a perspective view of the completed manufactured article whose circuit diagram is shown in Fig. 5;

The same parts in the drawings are represented by the same reference numerals throughout the figures.

Figure 7:
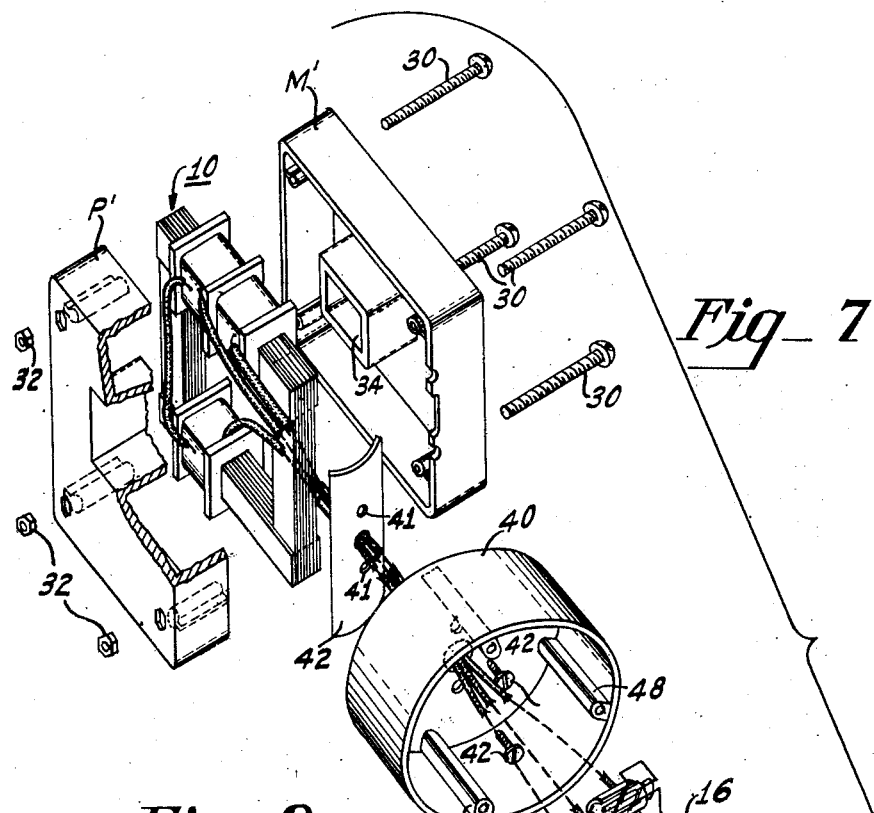
Fig. 7 is an exploded view of the device of Fig. 6.

An understanding of the electrical principles involved in the current indicator of the invention may be had by first referring to the schematic circuit diagrams of Figs. 1 and 5; in which a core of magnetic material 10 characterized by high permeability and low retentivity, and preferably low eddy current losses, forms part of a transformer having a secondary winding 12 and a primary winding 14. Magnetic material 10 may be any commercial transformer laminated sheet material (such material meets the foregoing requirements) and has legs A, B, C and D. The primary winding comprising two turns of wire is wound around one leg B while the secondary winding 12 illustrative of many thousands of turns of wire is wound around leg D. From a practical standpoint it does not matter whether primary winding 14 is wound around legs A, B or C. The alternating current to be measured is coupled to terminals 22 of the primary winding. Coupled across the terminals of the secondary winding is a glow lamp 18 connected in series with a current limiting resistor 16. Glow lamp 18 comprises a glass envelope enclosing any suitable inert gas such as neon, argon or crypton, and in which there are two electrodes which when excited by a proper value of voltage will ignite the gas and cause the lamp to become illuminated. A feature of the invention is the U-shaped metallic shield 20 which surrounds the rear half of the glow lamp and is connected to one electrode of the lamp, and which serves to minimize the affect of electrostatic fields caused by the presence of other bodies in the general vicinity of the lamp.

Fig. 5 differs from Fig. 1 essentially in the use of a high resistance potentiometer 24 whose tap T is connected to one electrode of glow lamp 18. The secondary winding 12' of Fig. 5 has an intermediate terminal connected to one end of the potentiometer and its opposed terminals connected respectively to the other end of the potentiometer and to the other electrode of the glow lamp.

The current to be measured flows through the transformer primary 14. The transformer secondary 12 or 12' develops a peak voltage proportional to the primary current. This secondary voltage is impressed across the glow lamp which lights up for a particular value of voltage across the secondary related to the current in the primary. Since the impedance through the glow lamp becomes relatively low once it lights up, the current limiting resistor acts to limit the current in the glow lamp circuit and prevents damage to the instrument. In Fig. 5, the secondary voltage is developed across the potentiometer 24. Depending on the potentiometer setting; viz., the position of tap T, a predetermined amount of the impressed voltage is applied to the electrodes of the glow lamp.

The calibration of the current indicators of the invention is based on the extinction potential of the glow lamp. For a given current, the lamp in Fig. 1 will become illuminated. In Fig. 5, for a given current, the tap or slider T is adjusted so that the lamp just extinguishes. A pointer on a shaft fastened to tap T indicates the current being measured on a suitably calibrated scale, as will be seen from an inspection of Figs. 6, 7 and 8. Thus the indicator will furnish one reading which is equal to the ignition potential of the glow lamp.

The graphical representation of Fig. 2 illustrates that the neon glow lamp is essentially a peak voltage operating device. The abscissa represents primary ampere turns while the ordinate represents secondary volts developed across the secondary and applied to the neon lamp. It will be observed that the secondary voltage vs. primary current curve 26 representing average secondary voltage flattens out at about twenty ampere turns, whereas the peak secondary voltage curve 28 has no marked flattening up to one-hundred and fifty ampere turns. Because the secondary voltage indicator is peak responding, it is linear over a wide range of primary current and does not require an excessive number of turns with a given core structure such as would be required if the secondary voltage indicator were not peak responding.

Fig. 3 illustrates the appearance of one embodiment of the alternating current indicator as sold and ready for use. The exploded view showing the component parts is shown in Fig. 4. An important feature is the molded plastic insulating case composed of two complementary parts M and P which, when secured together by four screws 30 and associated nuts 32, completely conceals the magnetic core 10 with its associated glow lamp 18 and secondary winding 12. An opening 34 in the plastic case registers with the central opening 36 of the magnetic core 10 and enables the passage therethrough of one or more turns of test wire adapted to carry the current to be measured. This opening 34 in the plastic case is surrounded by plastic material and conceals the core opening 36.

The magnetic core 10 shown in Fig. 4 comprises strips of steel laminations 9 in the form of a square with a central core opening. In one embodiment of the invention in accordance with Figs. 3 and 4 actually constructed and satisfactorily used in practice, the laminations 9 were silicon steel, known as Allegheny Super Dynamo, 1½" x ¼" x .019" thick. The secondary winding 12 had 10,000 turns of No. 44 wire with a ¼" x ¼" central core opening for surrounding one leg of the magnetic material 10. Seven laminations 9 were in the leg D surrounded by the coil 12 and also in the parallel leg B outside the coil. Six laminations 9 were used in each of the two end legs A and C. The laminations were interleaved ¼" at each end leaving an opening 36 in the center 1" square, part of which was occupied by the secondary winding. The current limiting resistor 16 was 200,000 ohms, and the glow lamp was a neon lamp commercially sold by the code designation NE-2.

The tiny glow lamp 18 (about 1" long) and shield 20 were mounted on one edge of leg A or C, as shown in Fig. 4, and the lamp was viewable from the outside of the plastic insulating case through a small aperture 40 adjacent the glow lamp in the housing M, P, as seen in Figs. 3 and 4.

The current indicator of Figs. 3 and 4, as constructed and used is small enough to be held in the palm of the hand and weighs about two ounces. It can be thrown into a tool box and is extremely rugged from both a physical and electrical standpoint. It is burn-out proof.

In using the current indicator of Figs. 3 and 4, a single current carrying test lead is passed through the opening 34 substantially in the center of the device. With a single lead through opening 34, the glow lamp having an ignition voltage of 48 volts A. C. will light up when the current exceeds twelve amperes of sinusoidal 60 cycles A. C. 120 volts. By threading the current carrying test lead (insulated of course) through the opening 34, over the side of the insulating casing and back through the opening 34 again so that two, three, or four wires are passed through opening 34, the current at which the glow lamp will light up will decrease to $$\frac{12}{N}$$

amperes, where N is the number of turns or leads through the opening 34. Thus the glow will occur at 6 amperes with two passes or turns of the test wire through opening 34. In this way, tests can easily be made on loads drawing currents from several tenths of an ampere to twelve amperes. The measurements obtained are accurate within 5% and do not depend upon the kind of insulation on the primary wire passed through opening 34, the way the turns are wound through opening 34, the line voltage or the size of the wire used in opening 34.

Figure 8:
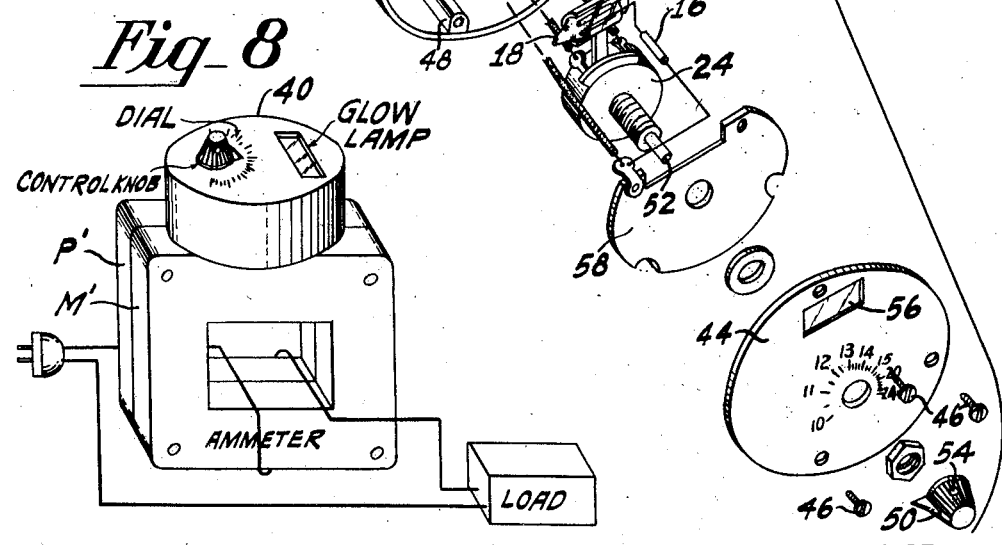
Fig. 8 shows one way in which the embodiment of Fig. 6 can be used in practice.

Figs. 6, 7 and 8 show another embodiment of the current indicator or measuring device of the invention, in which a potentiometer 24 is employed. The schematic circuit of this embodiment is shown in Fig. 5 and previously described. In addition to the use of the potentiometer, the embodiment of Figs. 6, 7 and 8 differs from that of Figs. 3 and 4 in employing a separate cylindrical plastic insulating case or housing 40 for enclosing the potentiometer 24, the glow lamp 18 and the current limiting resistor 16. Note Fig. 7. It will thus be seen that the magnetic material 10 and its secondary coil 12' is enclosed in one plastic casing identified by the complementary parts M' and P', while the potentiometer and glow lamp are enclosed in another plastic casing 40. The cylindrical plastic casing 40 is secured to one end of the plastic casing M', P' by screws which pass through spaced holes in the bottom of the casing 40 and enter threaded holes 41 in a metallic arcuate strip 42 adapted to be enclosed within the plastic casing M', P' in its assembled condition.

The cylindrical housing 40 has an insulating cover plate 44 adapted to be secured to housing 40 by screws 46. The screws 46 are designed to enter openings in the shoulders 48 of the cylindrical housing 40. A rotatable knob 50 is secured to the rotatable shaft 52 of the potentiometer 24 by a recessed screw 54 in the side of the knob 50. The cover plate 44 is also provided with an opening 56 through which the glow lamp can be viewed. On the underneath side of the cover plate 44 there is provided a cut-out insulating disc 58 which spaces the potentiometer from the cover plate and also mounts a terminal connection as shown in Fig. 7.

Cover plate 44 is also provided with dial markings constituting a calibrated scale for indicating the current readings at which the glow lamp lights up.

The scale markings on the indicator of Figs. 6 and 7 show that it will furnish a continuous current measurement from 10 to 24 amperes for a single passage of the current carrying test lead through opening 34. The range of measurement is adjustable by the design of the instrument and such factors as the number of secondary turns, the character of the magnetic core structure 10, such as the number of laminations, etc. The ratio of the turns in the two parts of the secondary winding 12' of Fig. 5, determines the spread on the calibration scale.

The scale range on the cover plate 44 may be decreased to any desired value by passing the current carrying test conductor through opening 34, back over any of the sides of housing M', P' and then again through the opening 34. If the conductor is passed through the opening 34 twice, the scale reading obtained should be divided by two. If the test conductor is wound through the opening 34 ten times, the scale reading obtained should be divided by ten. In general, the scale reading is divided by the number of turns or passes of the current carrying conductor through opening 34, in order to obtain the actual current flow in the primary circuit.

Fig. 8 illustrates one way in which the indicator of the invention of Figs. 6 and 7 can be used by a service man to measure the current through a load. Since the conductor passes through opening 34 twice in Fig. 8, the scale reading should be divided by two.

The alternating current indicator of the invention may be overloaded without danger of damage to the instrument and is burnout proof, aside from the possibility of burning out the test leads themselves. It is designed for use by servicemen, maintenance-men and electricians. It is useful for checking the operation of refrigerators, washing machines, heating elements, motors and electrical appliances of all sorts. It will also serve as a check for A. C. line current drawn by radio and television receivers.

What is claimed is:

1. An indicator of alternating current comprising a core of magnetic material having a central opening, a winding composed of a plurality of turns of wire around a portion of said core, an insulation housing of molded plastic material and of the same general shape as said core surrounding said core and winding, said housing being divided into two parts and completely concealing said core from view and having a generally central opening registering with the opening of said core, means for detachably securing together said two parts of said housing, a glow lamp located externally of said housing and having a pair of electrodes, a potentiometer also located externally of said housing and having a tap adjustable over the length thereof, a connection from one of said electrodes to said tap, a connection from the other of said electrodes to one terminal of said winding, one of said connections having a current limiting resistor serially arranged therein, another housing of molded plastic material enclosing said glow lamp, potentiometer and current limiting resistor, means for detachably securing together said two housings, a connection from one end of said potentiometer to another terminal of said winding, and a connection from the other end of said potentiometer to a point on said winding intermediate said terminals, said opening in said housing being unobstructed and sufficiently large to enable wire adapted to carry the current to be measured to be passed therethrough from the exterior of said first housing.

2. An indicator of alternating current as defined in claim 1, characterized in this, that said core of magnetic material and said first housing are of generally square configuration, said core being made up of strips of silicon steel interleaved at their ends, while said second housing has a cylindrical configuration and is mounted on one end of said first housing, said second housing being provided with a cover plate having a scale whose line markings represent a range of currents which can be indicated, said cover plate having an opening for enabling observation of said glow lamp.

3. An indicator of alternating current comprising a core of magnetic material having a central opening, a winding composed of a plurality of turns of wire around a portion of said core, a rectangular-shaped housing of molded plastic material and of the same general shape as said core surrounding said core and winding, said housing being divided into two rectangular-shaped halves and completely concealing said core from view and having a generally central opening registering with the opening of said core, means at the four corners of said housing for detachably securing together said two halves of said housing, said means including shoulders at each of the four corners of the two halves of said housing, a glow lamp located externally of said housing and having a pair of electrodes, a potentiometer also located externally of said housing and having a tap adjustable over the length thereof, a connection from one of said electrodes to said tap, a connection from the other of said electrodes to one terminal of said winding, one of said connections having a current limiting resistor serially arranged therein, a metallic electrostatic shield surrounding a portion of said glow lamp and connected to an electrode thereof, a cylindrical housing of molded plastic material enclosing said glow lamp, potentiometer and current limiting resistor and shield, means for detachably securing together said two housings, a connection from one end of said potentiometer to another terminal of said winding, and a connection from the other end of said potentiometer to a point on said winding intermediate said terminals, said opening in said housing being unobstructed and sufficiently large to enable wire adapted to carry the current to be measured to be passed therethrough from the exterior of said first housing.

NATHAN SCHNOLL.

References Cited in the file of this patent

UNITED STATES PATENTS

| Number | Name | Date |
|---|---|---|
| 1,457,784 | Maurer | June 5, 1923 |
| 1,744,706 | Hanny | Jan. 21, 1930 |
| 1,906,644 | Sleeper | May 2, 1933 |
| 2,129,524 | Camilli | Sept. 6, 1938 |
| 2,327,774 | Dickinson | Aug. 24, 1943 |
| 2,391,229 | D'Entremont | Dec. 18, 1945 |
| 2,433,511 | Goddard | Dec. 30, 1947 |
| 2,449,150 | Schnoll | Sept. 14, 1948 |
| 2,491,031 | Burgess | Dec. 13, 1949 |
| 2,509,815 | Elliott | May 30, 1950 |
| 2,525,768 | Bruns | Oct. 17, 1950 |

FOREIGN PATENTS

| Number | Country | Date |
|---|---|---|
| 172,102 | Great Britain | Nov. 30, 1921 |
| 829,522 | France | June 29, 1938 |